July 19, 1955 F. J. BOROWSKY 2,713,186
MOLDING-ANCHORAGE DEVICE FOR SECURING TRIM-MOLDING STRIPS
Filed April 20, 1953 2 Sheets-Sheet 1
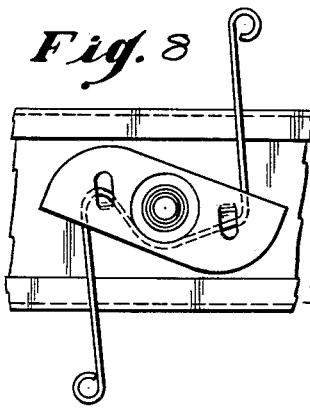
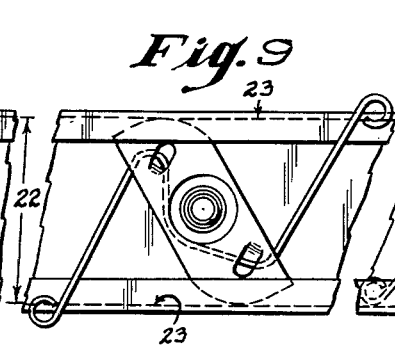
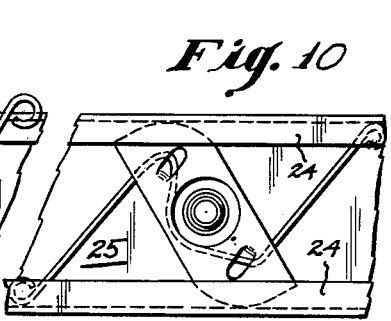
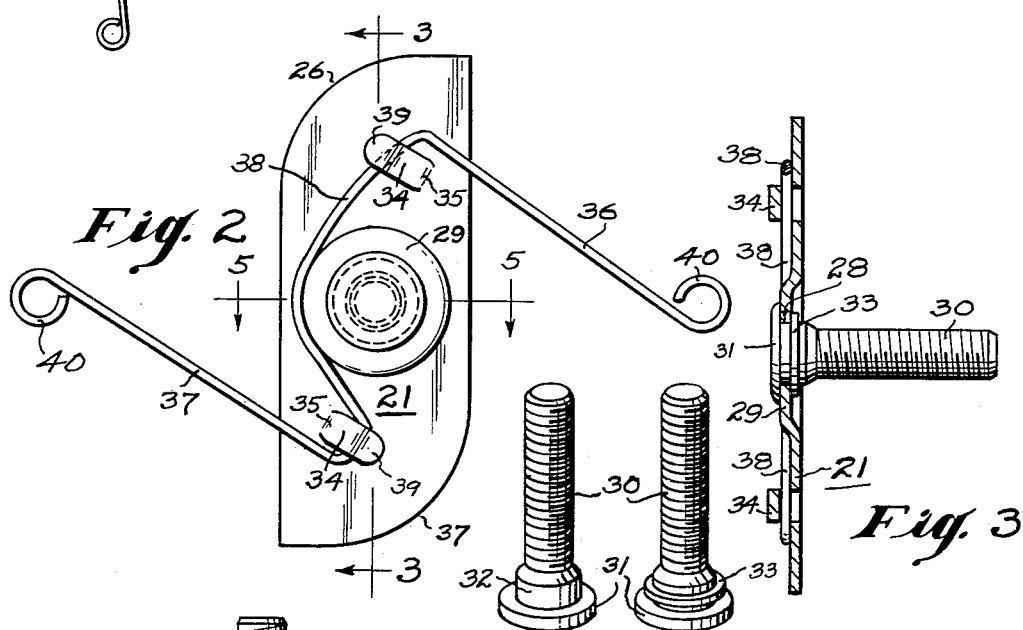
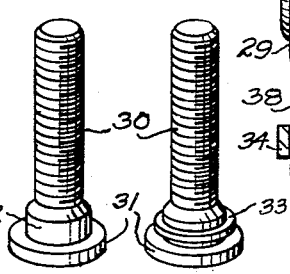
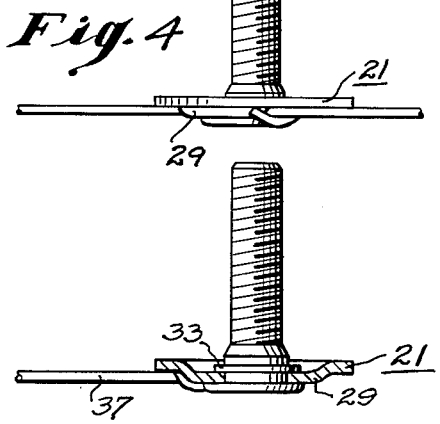
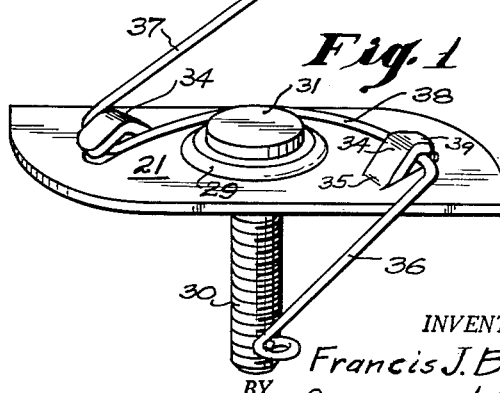
INVENTOR.
Francis J. Borowsky
BY Leonard L. Kalish
attorney July 19, 1955 F. J. BOROWSKY 2,713,186
MOLDING-ANCHORAGE DEVICE FOR SECURING TRIM-MOLDING STRIPS
Filed April 20, 1953 2 Sheets-Sheet 2
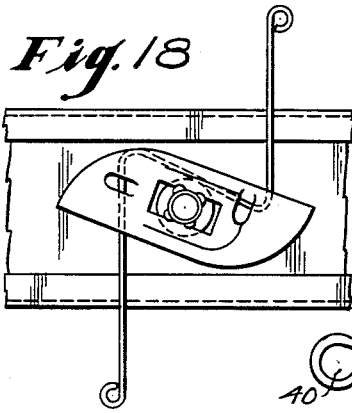
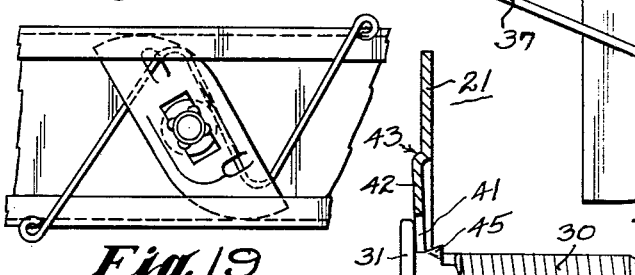
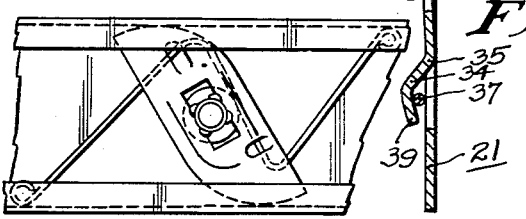
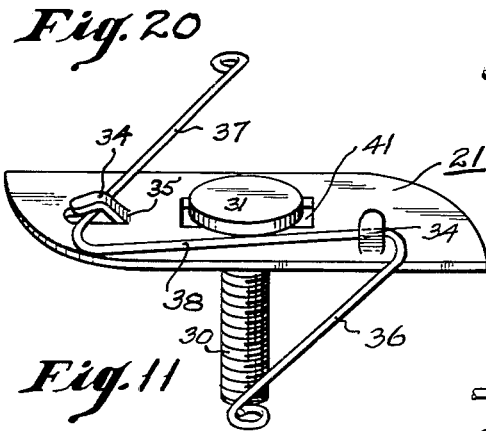
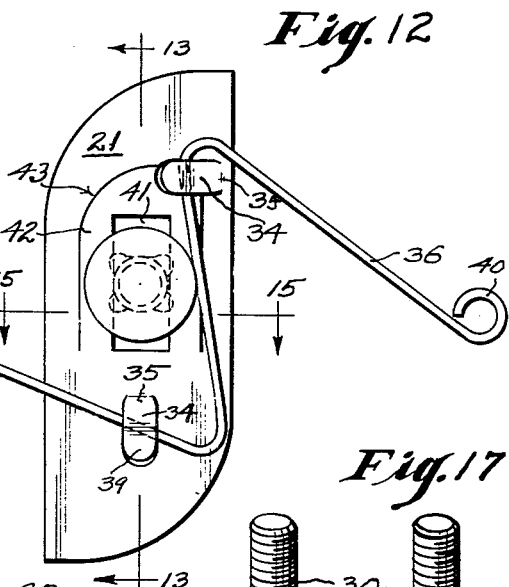
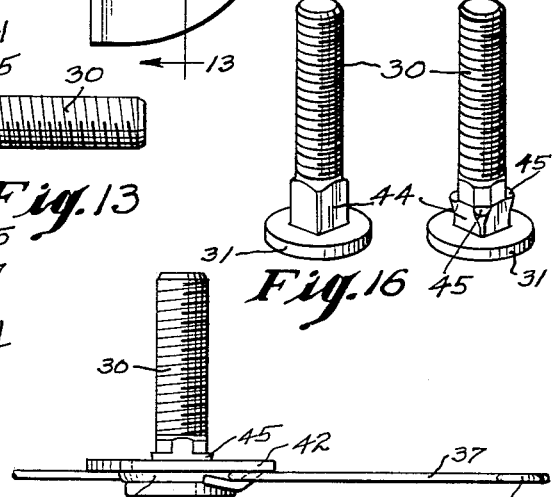
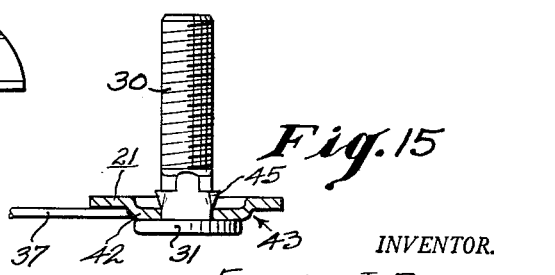
INVENTOR.
Francis J. Borowsky
BY
Leonard L. Kalish
attorney

United States Patent Office 2,713,186
Patented July 19, 1955

2,713,186

MOLDING-ANCHORAGE DEVICE FOR SECURING TRIM-MOLDING STRIPS

Francis J. Borowsky, Elkins Park, Pa., assignor to George K. Garrett Company, Inc., Philadelphia, Pa., a corporation of Delaware Continuation of application Serial No. 276,113, March 12, 1952. This application April 20, 1953, Serial No. 349,727

3 Claims. (Cl. 24—73)

The present invention relates to molding-supporting devices, sometimes called molding-clips, whereby channel-cross-section metallic molding may be fastened to the body of an automobile or the like.

This application is a continuation of my co-pending application, Serial No. 276,113, filed March 12, 1952, now abandoned.

Thus, the present invention relates to molding-clips of the general type shown in United States Patents Nos. 2,184,255; 2,192,344; 2,218,832; 2,221,124; 2,471,254; 2,473,400; 2,515,895; 2,521,354; 2,531,348; 2,531,351; 2,531,352; and 2,563,121.

One of the objects of the present invention is to provide an inexpensive and yet dependable molding-clip or molding-fastener which can be manufactured of inexpensive materials with minimum waste and which would be more effective in actual use and which may be readily applied to the molding.

In the accompanying drawings in which like reference characters indicate like parts, Figure 1 represents a perspective view of one embodiment of the present invention.

Figure 2 represents a plan view of the same.

Figure 3 represents a section on line 3—3 of Figure 2.

Figure 4 represents a side-elevational view of the same.

Figure 5 represents a section on line 5—5 of Figure 2.

Figure 6 represents a perspective view of the bolt prior to the formation of the locking bead thereon.

Figure 7 represents a similar perspective view of the bolt after the bead has been swaged thereon.

Figure 8 represents a plan view of the molding-clip in its first stage of application to the molding.

Figure 9 represents a similar view of the next stage of the application of the molding.

Figure 10 represents a similar view showing the final stage of its application to the molding.

Figure 11 represents a perspective view of a modified embodiment of the present invention.

Figure 12 represents a plan view of the same.

Figure 13 represents a section on line 13—13 of Figure 12.

Figure 14 represents an end elevational view of the same.

Figure 15 represents a section on line 15—15 of Figure 12.

Figure 16 represents a perspective view of the bolt prior to the upsetting of the corners of the square portion thereof.

Figure 17 represents a similar perspective view of the bolt after the corners have been swaged to form projections.

Figure 18 represents a plan view showing the first stage of the application of the clip to the molding.

Figure 19 represents a second stage of the application of the clip to the molding.

Figure 20 represents the final stage of the application of the clip to the molding.

The molding of the present invention includes a plate-like bar 21 which may be formed of inexpensive sheet steel without being hardened or spring-tempered, and of a length greater than the width or clearance 22 between the inner surfaces 23 of the inturned flanges 24 of the channel-cross-sectioned molding 25. The molding 25 may be any conventional decorative or functional molding of the type applied to the exterior of automobiles and other machinery and appliances and is generally chromium plated. The cross-section of the molding may be any channel-shaped cross-section, as, for instance, a cross-section indicated in Figure 1 of Patent 2,531,348 or in Figure 1 of Patent 2,531,351 or that shown in Figure 1 of Patent 2,221,124 or that shown in Figures 1, 5, 10, 15 and 18 of Patent 2,515,895 or in Figures 1 and 2 of Patent 2,531,352 or Figures 1, 3 and 5 of Patent 2,478,-400 or that shown in Figures 1, 2 and 6 of Patent 2,471,254.

The anchorage plate 21 may be rounded at its corners 26 and 27. At the center of the plate 21 a hole 28 is punched, and the surrounding portion 29 pressed outwardly to create a boss-like reinforcing portion 29. The bolt 30, having a flat head 31 and an intermediate shank portion 32 adjacent the head, of a diameter somewhat smaller than the head but somewhat larger than the screw portion, is inserted into the hole 28, and thereafter the extending or projecting portion of 32 is swaged or broached by any suitable tubular swaging or broaching tool to skive or swage therefrom the small projecting bead 33 which overlaps the portion 29 immediately surrounding the hole 28, so as to lock the bolt permanently to the plate 21 in the manner shown in Figure 3.

Prior to the application of the bolt 30 to the plate 21, however, and preferably during the original formation of the plate (in the punch press) between the stamping or forming punch-and-die, a pair of lugs 34, facing in opposite directions, are struck outwardly from the plate 21 in the manner indicated in Figures 1, 2 and 3 (and in Figures 11, 12 and 13). The lugs 34 are bent out but left integral with the plate at their bases 35. The spring-wire member having a pair of arms 36 and 37 and an intermediate portion 38, the latter bent to pass around the boss 39 as in Figures 1, 2 and 3, is held in place by the lugs 34, the free ends 39 of which are bent over towards the opening from which they were struck, in the manner indicated particularly in Figure 1 (and in Figures 11 and 12), so as to hold the spring-wire member in place. The arms 36 and 37 have coiled or curled ends 40, so as to give rounded contact points and to facilitate the handling of these ends in the process of inserting them into the channel of the molding 25.

In this manner a turn-buckle-like structure is formed of a simple turn-plate or buckle element 21 which need not be spring-tempered and can be formed of any suitable sheet metal of adequate thickness and rigidity, and of an inexpensive spring-member composed of a pair of arms and an intermediate portion, held to the plate or turn-buckle member 21 by means of up-struck and bent-over lugs 34.

In mounting the plate 21, it is inserted in the manner indicated in Figures 8 and 18, and then turned so that its ends are beneath the inturned flanges 24 of the molding as shown in Figures 9 and 19, and, thereafter, the spring arms 36 and 37 are flexed so that the curled ends 40 thereof are inside the innermost edges of the flanges and are then permitted to expand beneath the flanges as shown in Figures 10 and 20.

In the modified form of construction shown in Figures 11 to 20, inclusive, the plate 21 has an elongated rectangular hole 41 punched therethrough, with the surrounding portion 42 pressed outwardly slightly along the line 43, to give reinforcement to the central portion of the plate 21. In this form of construction the bolt 30 is provided with a square shank portion 44 immediately adjacent to the flat head 31 of the bolt, which, after insertion into the slot 41, into which the square shank 44 slidably fits, is then held in place by swaging the four corners of the shank portion 44 to form the slight outward projections 45, which will hold the bolt in place, but which will yet permit the bolt to slide to and fro in the slot at a right angle to the axis of the bolt.

In this construction the lugs 34 are inclined in a somewhat different direction than in the form shown in Figure 2, but nevertheless in such manner that the spring-member will be securely anchored against shifting. In each form (Figures 2 and 12) the base portions 35 of the lugs 34 are so disposed that the flexing of the arms 36 and 37 in the final application shown in Figures 10 and 20 will cause the interlocked portions of the spring-wire to be urged towards the anchored base portions 35 of the lugs (rather than towards the bent-over free ends 39 thereof).

By this modified form of construction the position of the bolt may be adjusted transversely of the channel or molding.

By my present construction in turn-buckle-type molding-fasteners, a less expensive and more effective construction is achieved, because the turn-buckle portion, namely, the plate 21 is turned and held in place by two equal spring arms 36 and 37 and the plate itself is not relied upon as any part of the turning means. The plate itself is passive and only the spring arms 36 and 37 are active. In this manner a more effective turn-buckle-type of molding anchorage or molding-fastener is obtained.

Likewise, by my present construction, the cost of manufacture is appreciably reduced because the spring metal which is both more expensive initially and which requires more expensive operations, is limited to the spring member consisting of the two arms and the intervening portion 38, and this spring member can be formed from spring-wire (round or any other suitable cross-section), such as piano wire or the like, and can be formed without any annealing, by the usual spring-forming methods and apparatus.

Moreover, by the present construction the waste or scrap is reduced to a minimum; there being virtually no sheet metal scrap, except the portions of the corners that are taken away at 26 and 27 and the scrap produced by the punching of the center hole and there being no waste or scrape whatever of the spring-wire.

While in the embodiment shown, the spring-member is placed on the side of the plate 21 opposite to the side from which the screw projects, I may also reverse this and put the spring-member on the same side as the main body of the screw.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described my invention, I claim as new and desire to protect by Letters Patent:

1. A molding-anchorage device, for securing trim-molding strips to the body of automobiles and the like, which molding strips include a pair of opposed in-turned flanges at the back thereof, said molding-anchorage device including a relatively thin and generally elongated flat anchorage-plate whose width is less than the clearing between the inner face edges of the in-turned molding flanges, whose thickness is less than that between opposed inner flange and molding surfaces, and whose length is greater than the distance between the outer bights of said in-turned molding-flanges, a fastener-post extending from the central zone of said anchorage-plate, at a right angle thereto, said post adapted to extend through the body-wall to which the molding-strip is to be mounted and to be secured to said body-wall, a pair of spring-arms, formed of a single piece of spring wire mounted upon said anchorage-plate in a plane parallel and immediately adjacent thereto and flexibly secured thereto, and so disposed that by insertion of said spring arms beneath the in-turned flanges of the molding, the anchorage-plate will be resiliently turned so as to cause the end portions of the anchorage-plate to be disposed beneath the in-turned molding flange and there to be retained by said spring-arms.

2. A molding-anchorage device, for securing trim-molding strips to the body of automobiles and the like, which molding strips include a pair of opposed in-turned flanges at the back thereof, said molding-anchorage device including a relatively thin and generally elongated flat anchorage-plate whose width is less than the clearing between the inner face edges of the in-turned molding flanges, whose thickness is less than that between opposed inner flange and molding surfaces, and whose length is greater than the distance between the outer bights of said in-turned molding-flanges, a fastener-post extending from the central zone of said anchorage-plate, at a right angle thereto, said post adapted to extend through the body-wall to which the molding-strip is to be mounted and to be secured to said body-wall, a pair of spring-arms, formed of a single piece of spring wire mounted upon said anchorage-plate in a plane parallel and immediately adjacent thereto and flexibly secured thereto, said spring wire being anchored to said anchorage-plate by a pair of spring-anchorage lugs formed from said plate, said spring-anchorage lugs each having one end integral with said anchorage-plate and the other end free, the integral ends of said lugs being so disposed in relation to the spring-arms, that when the spring-arms are operatively flexed so as to be inserted within their operative positions, the lug-engaged portion of the spring wire will be urged in the direction of the integral ends of the lugs, said spring-arms being so disposed that by insertion of said spring arms beneath the in-turned flanges of the molding, the anchorage-plate will be resiliently turned so as to cause the end portions of the anchorage plate to be disposed beneath the in-turned molding flange and there to be retained by said spring-arms.

3. A molding-anchorage device, for securing trim-molding strips to the body of automobiles and the like, which molding strips include a pair of opposed in-turned flanges at the back thereof, said molding-anchorage device including a relatively thin and generally elongated flat anchorage-plate whose width is less than the clearing between the inner face edges of the in-turned molding flanges, whose thickness is less than that between opposed inner flange and molding surfaces, and whose length is greater than the distance between the outer bights of said in-turned molding-flanges, a fastener-post disposed within an aperture in the central portion of the anchorage-plate, said aperture permitting the fastener-post to be longitudinally displaceable in respect to said anchorage-plate, said fastener-post operatively extending from the central zone of said anchorage-plate, at a right angle thereto, said post adapted to extend through the body-wall to which the molding-strip is to be mounted and to be secured to said body-wall, a pair of spring-arms, formed of a single piece of spring wire mounted upon said anchorage-plate in a plane parallel and immediately adjacent thereto and flexibly secured thereto, and so disposed that by insertion of said spring arms beneath the in-turned flanges of the molding, the anchorage-plate will be resiliently turned so as to cause the end portions of the anchorage-plate to be disposed beneath the in-turned molding flange and there to be retained by said spring-arms.

References Cited in the file of this patent

UNITED STATES PATENTS

| | | |
|---|---|---|
| 2,254,310 | Place | Sept. 2, 1941 |
| 2,531,351 | Churchill | Nov. 21, 1950 |
| 2,515,895 | Poupitch | July 18, 1950 |
| 2,604,776 | Goldsmith | June 29, 1952 |